United States Patent
Gross et al.

(10) Patent No.: US 12,181,998 B2
(45) Date of Patent: Dec. 31, 2024

(54) PATTERN-RECOGNITION ENABLED AUTONOMOUS CONFIGURATION OPTIMIZATION FOR DATA CENTERS

(71) Applicant: Oracle International Corporation, Redwood Shores, CA (US)

(72) Inventors: Kenny C. Gross, Escondido, CA (US); Sanjeev Raghavendrachar Sondur, Horsham, PA (US); Guang Chao Wang, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/171,620

(22) Filed: Feb. 20, 2023

(65) Prior Publication Data
US 2023/0205662 A1   Jun. 29, 2023

Related U.S. Application Data

(63) Continuation of application No. 16/801,590, filed on Feb. 26, 2020, now Pat. No. 11,586,522.

(51) Int. Cl.
*G06F 11/34* (2006.01)
*G05B 13/02* (2006.01)
(Continued)

(52) U.S. Cl.
CPC ...... *G06F 11/3433* (2013.01); *G05B 13/0265* (2013.01); *G05B 13/042* (2013.01); *G06F 1/206* (2013.01); *G06N 20/00* (2019.01)

(58) Field of Classification Search
CPC .... G06F 11/3433; G06F 1/206; G06F 11/302; G06F 11/3058; G06F 11/3409;
(Continued)

(56) References Cited

U.S. PATENT DOCUMENTS

| 8,164,434 B2* | 4/2012 | Gross ............... G05B 13/048 374/100 |
| 11,586,522 B2* | 2/2023 | Gross ............... G05B 13/042 |

(Continued)

FOREIGN PATENT DOCUMENTS

| WO | WO-2012142620 A1 * | 10/2012 | ......... G05D 23/1934 |
| WO | 2019126535 A1 | 6/2019 | |

OTHER PUBLICATIONS

Biswas ("Auto-scaling techniques for clouds processing requests with service level agreements" (2019). (Doctoral dissertation, Carleton University)) (Year: 2019).*

(Continued)

*Primary Examiner* — Roy Y Yi
(74) *Attorney, Agent, or Firm* — Kilpatrick Townsend & Stockton LLP

(57) ABSTRACT

A model-based approach to determining an optimal configuration for a data center may use an environmental chamber to characterize the performance of various data center configurations at different combinations of temperature and altitude. Telemetry data may be recorded from different configurations as they execute a stress workload at each temperature/altitude combination, and the telemetry data may be used to train a corresponding library of models. When a new data center is being configured, the temperature/altitude of the new data center may be used to select a pre-trained model from a similar temperature/altitude. Performance of the current configuration can be compared to the performance of the model, and if the model performs better, a new configuration based on the model may be used as an optimal configuration for the data center.

20 Claims, 11 Drawing Sheets

(51) Int. Cl.
*G05B 13/04* (2006.01)
*G06F 1/20* (2006.01)
*G06N 20/00* (2019.01)

(58) Field of Classification Search
CPC ............... G06F 11/3457; G06F 9/5094; G05B 13/0265; G05B 13/042; G06N 20/00; Y02D 10/00
See application file for complete search history.

(56) References Cited

U.S. PATENT DOCUMENTS

| | | | |
|---|---|---|---|
| 2010/0076607 A1* | 3/2010 | Ahmed | G06F 1/206 700/297 |
| 2018/0058976 A1* | 3/2018 | Gross | G01M 7/025 |
| 2018/0159727 A1 | 6/2018 | Liu et al. | |
| 2018/0303003 A1* | 10/2018 | Meinhart | H05K 7/20772 |
| 2018/0345496 A1* | 12/2018 | Li | B25J 9/161 |
| 2019/0370051 A1 | 12/2019 | Fu et al. | |
| 2020/0015389 A1* | 1/2020 | Gao | F25B 25/005 |
| 2021/0021469 A1* | 1/2021 | Sondur | H04L 41/147 |

OTHER PUBLICATIONS

Gross; Kenny, *Reliability Through Telemetry*, Sun Microsystem, Oct. 14, 2004, 36 pages.
International Application No. PCT/US2021/018750, International Search Report and Written Opinion, mailed on May 19, 2021, 15 pages.
PCT/US2021/018750, "International Preliminary Report on Patentability," Sep. 9, 2022, 12 pages.
Japanese Patent Application No. 2022-551347, Office Action mailed on Nov. 5, 2024, 3 pages.

* cited by examiner

PATTERN-RECOGNITION ENABLED AUTONOMOUS CONFIGURATION OPTIMIZATION FOR DATA CENTERS

CROSS-REFERENCES TO RELATED APPLICATIONS

This application is a continuation of U.S. patent application Ser. No. 16/801,590, filed on Feb. 26, 2020, which is incorporated herein by reference.

BACKGROUND

A data center may include any collection of computer systems and associated components such as processing systems, telecommunications systems, and data storage systems. A data center may include a number of servers or CPU cores for performing processing operations, network equipment for communications, memory devices for storing data, and/or redundant or backup components for infrastructure, power supplies, data storage and/or data communications. Modern data centers may be private/internal data centers that are installed on a customer's on-premises facility, while other data centers may be may be public-facing, cloud-based data centers that are provided by service providers. Cloud-based data centers provide hardware and/or software that may be used by cloud tenants to execute their data operations.

A data center configuration may include any configuration parameters that define the makeup and operation of a data center. The configuration of a data center may be instrumental in installing and operating various hardware and software components to meet the operating requirements. Generally, determining an optimal data center configuration is a very complex process, yet selecting the proper configuration is key to ensuring the satisfactory performance of the data center. Sub-optimal configurations may result in long latency, low throughput, multiple I/O timeouts, and ultimately violations of service-level-agreements. Because of the complexity of the interactions between the various software/hardware components in a data center, determining an optimal configuration is currently considered more of an art than a science backed by empirical results. This often leads to a trial-and-error process that can take days or weeks to complete. Therefore, improvements in technologies for determining an optimal data center configuration may be beneficial.

BRIEF SUMMARY

The performance of computer hardware in a data center is becoming increasingly dependent on environmental factors such as ambient temperature and altitude. At higher temperatures, fan speeds must be increased to cool the data center during CPU-intensive and memory I/O-intensive workloads. At higher altitudes, fan speeds must be increased to compensate for thinner air. In turn, the increased fan speeds translate into more vibrational and acoustic noise that interferes with the mechanical operation of hard disk drives. The increased temperature also causes more throttling in CPU speeds and voltages. Without taking these environmental factors properly into account, data center configurations cannot be systematically optimized for performance.

The embodiments described herein solve these and other technical problems by using a parameterized, machine-learning, pattern recognition technique to optimize a data center configuration. Various data center configurations can be placed in an environmental chamber that cycles through different environmental conditions, such as different altitude and temperature combinations. A stress workload can be executed on the data center in the environmental chamber, and a full telemetry readout can be provided at each set of environmental conditions. The telemetry data can then be used to train a model, such as an MSET model or an MSET2 model at each altitude/temperature combination.

When installing a new data center, the stress workload can be executed using a default data center configuration, and telemetry signals can be captured in real time. Different performance metrics can be calculated for the default condition, including CPU efficiency, I/O efficiency and throughput, and other Quality of Service (QoS) metrics. If the performance of the default configuration is not satisfactory, the operating conditions of the new data center can be used to select a nearest-match model from a library of pre-trained models. The selected pre-trained model may have been trained using configurations operating in similar environmental conditions in the environmental chamber prior to the installation of the new data center. For example, the altitude and/or temperature of the new data center can be used to select a nearest-match model that was trained at a similar altitude and/or temperature. The model can then be used to determine an optimal configuration to be used for the new data center. Instead of multiple iterations of trial-and-error adjustments to a default configuration, this method provides an optimal configuration using a maximum of two different configuration tests, thereby reducing the time required for the set up of new configurations from days down to a matter of hours.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Optimizing configurations for modern data centers is becoming a critical process for delivering predictable Quality-of-Service (QoS) to customers of both on-premise and cloud-based data centers. Traditionally, data centers were configured without much regard for environmental characteristics, such as temperature and altitude. A data center would be configured to optimize CPU and I/O performance of the data center such that the configuration would meet the Service Level Agreement (SLA) for the customer. This configuration was then assumed to be valid across a range of environmental conditions. For example, 10 years ago, temperature fluctuations between 20° C. and 30° C. did not significantly impact the performance of the data center. Similarly, variations in elevation between sea level and 5,000 feet did not dramatically affect the operation of data center hardware/software. Generally, the nature of the computer hardware used over the first 25-30 years of data center computing was such that CPU and I/O performance were only minimally impacted by changes in the ambient temperature or the altitude of the data center. Therefore, the configurations used to design data centers could be readily implemented in multiple data centers with different operating temperatures and/or altitudes.

However, advances in CPU and memory technologies, along with the increased prevalence of CPU-intensive and I/O-intensive workloads, have created a situation where data center performance has now become heavily dependent on temperature and altitude. This dependence may have the greatest impact on modern data center configurations that include aggressive CPU designs using Dynamic Voltage and Frequency Scaling (DVFS) and/or memory storage using spinning hard disk drives (HDDs) rather than solid-state drives (SDDs). This effect of temperature and altitude on performance applies to all information technology (IT) systems regardless of the manufacturer. Temperature and altitude have also been shown to affect both on-premises data centers and cloud data centers alike, as well as internal HDDs and external storage arrangements, such as Network-Attached Storage (NAS). Furthermore, this is a problem that will continue to grow in the future as dependence on ambient temperature/altitude grows exponentially with each new generation of CPUs and HDDs.

Figure 1:
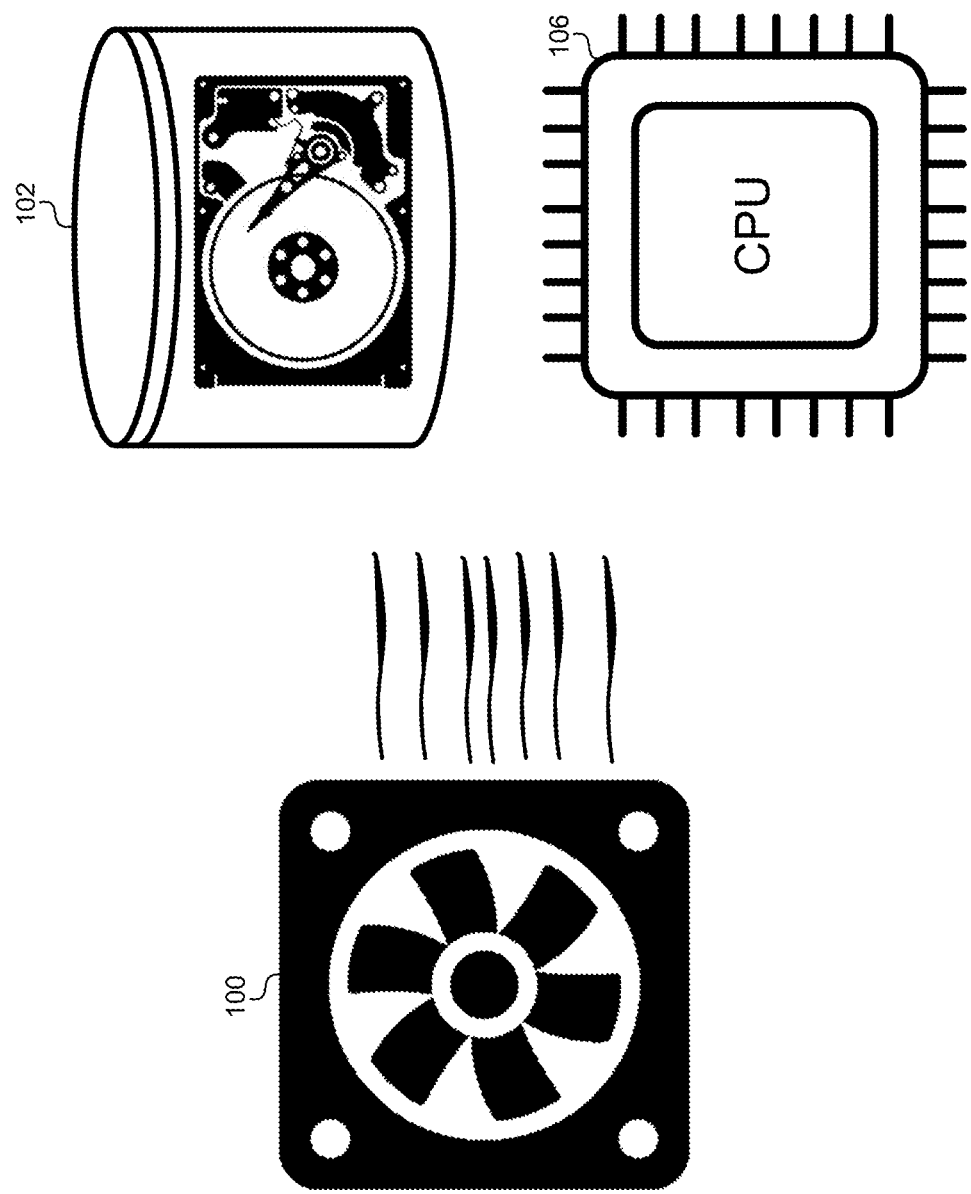
FIG. 1 illustrates a simplified diagram of a cooling system for a data center, according to some embodiments.

FIG. 1 illustrates a simplified diagram of a cooling system for a data center, according to some embodiments. The majority of servers and storage systems use fans 100 to air-cool the internal components. Additionally, many storage systems may include internal power supplies that are also equipped with cooling fans. These fans 100 may be equipped with variable speeds to adapt to variable temperatures in the data center. As the ambient temperatures in the data center rise, the fan speeds may also increase proportionally to cool the internal components.

A modern HDD 102 has been found to be extremely sensitive to even the slightest vibration. For example, mechanical and/or acoustic vibrations severely degrade I/O rates for the HDD 102. As the ambient temperature increases, and the speed of the fan 100 increases to compensate, the mechanical vibration from the fan 100 also increases. These mechanical vibrations may disturb the read/write operations of the HDD 102 and thereby degrade the performance of the HDD 102. Additionally, the acoustic noise from the fan may also increase as the fan speed increases. This acoustic noise also affects the HDD and further degrades the I/O performance. Thus, as data centers operate at higher temperatures, the mechanical and acoustic vibrations from the increased fan speeds measurably lower the I/O performance of the HDD 102. This effect stemming from higher temperatures is likely to grow in the future, as data centers around the world are presently raising their ambient temperatures to above 30° C. to 35° C. in attempts to conserve energy used for air-conditioning. However, the corresponding degradation of performance at higher temperatures increases the time it takes to perform customer workloads, which in turn offsets potential energy savings from increasing the operating temperature.

In addition to the effects of increasing temperature, it has also been discovered that changes in altitude may cause additional degradations in the performance of the HDD 102. For example, high-altitude data centers will be located in areas where the air is thinner than it would be at data centers located at sea level. The thinner air at these higher altitudes has less cooling capacity. This requires the fan 100 to increase its speed even more to increase the airflow through the server. This increased fan speed may be added to the increase described above due to warmer temperatures, and may further generate mechanical and/or acoustic vibrations that disrupt the performance of the HDD 102. For example, fans typically run 13% faster at high-altitude environments (e.g., Denver Colorado) when compared to similar data center configurations at sea level.

FIG. 1 also illustrates a CPU that may be part of a data center configuration. In addition to affecting the I/O performance of various memory components, increases in temperature can also adversely affect the performance of the CPU 106 when using DVFS. Systems using DVFS generally adjust the power and/or speed settings on the CPU and other peripheral devices to optimize resource consumption. DVFS allows the CPU 106 to perform CPU workloads using a minimum amount of required power for the workload to maximize power savings and improve the longevity of the CPU 106. The system monitors the workload and dynamically adjusts the operating voltage and/or clock frequency to match the performance of the CPU with the requirements of the workload.

Modern CPUs and Graphics Processing Units (GPUs) use very sensitive and aggressive DVFS schemes to throttle frequencies and/or operating voltages continuously. However, higher temperatures generally cause more leakage current in the CPU 106, and thus DVFS frequency throttling increases exponentially with each degree of temperature increase. For example, increasing from 15° C. to 35° C. shows more than a 50% degradation in CPU performance as the altitude of the data center increases from sea level to 10,000 feet. This combination of CPU and I/O performance degradation due to temperature and altitude provides a formidable challenge for any data center that is being installed in a new operating environment.

Previously, the process for configuring a data center was an iterative process that involved multiple trial-and-error cycles to adjust various aspects of the configuration to meet the SLA requirements for the data center. When a data center was installed, a default configuration was used, and the performance of the data center was then evaluated to determine whether the default configuration met the SLA requirements. The default configuration was often created in an environment having a different operating temperature and/or altitude compared to that of the data center being installed. Because of the effects of higher temperatures and/or altitudes described above, the performance of the new data center would often not match the performance of the data center for which the default configuration was originally designed. If the performance of the new data center was not satisfactory, various parameters in the data center configuration were adjusted, and a new configuration was implemented for the data center and tested against the SLAs. This process would be continued repeatedly until a satisfactory data center configuration was identified. This required multiple iterations, which added a significant delay to the set up time for a data center.

In addition to the multiple iterations required to initially configure a new data center, changes in temperature and altitude after installation and during operation would commonly cause an initially satisfactory configuration to fail the SLA requirements during I/O-intensive or CPU-intensive workloads. Even if the default configuration was eventually optimized for the new data center, increasing temperatures in the new data center could degrade the performance of the CPU 106 and the performance of the HDD 102 for the reasons described above. This degradation of performance caused timeout errors for the customer and increased the time required to complete customer workloads, which consequently caused customer dissatisfaction and incident escalations when SLA requirements were not met. Diagnosing the root cause of this performance degradation is a very difficult process, particularly when caused by fluctuations in temperature and/or altitude differences. To resolve this situation after a new data center was been configured, data center administrators often had to provide an entirely new configuration. The new configuration would then often face the same timeout errors, performance degradation, and consistency challenges as were observed in the original configuration of the data center.

The embodiments described herein solve these and other technical problems by using an automated configuration optimization framework to determine an optimal data center configuration given the workload of memory, CPU, and I/O performance that may be needed for any customer use case scenario. These embodiments may utilize an environmental chamber to control the environmental characteristics of a variety of different data center configurations. For example, a thermal/altitude chamber may be used to cycle through a wide range of temperatures and/or altitudes such that the performance of a data center configuration can be measured against different combinations of environmental characteristics. As various data center configurations are tested at different temperature and altitude combinations, a library of models may be trained corresponding to each altitude/temperature combination. After the library of models have been trained, this library may be used to determine an optimal configuration for new data centers as they are installed and configured. The environmental characteristics of the installed data center may be used to select a nearest-neighbor model in the library. Similar operating requirements may then be provided to the model to predict various performance metrics, such as CPU performance, memory I/O performance, and so forth. If the performance metric generated by the model is better than the performance of the installed data center, then the configuration provided by the model may be used to configure the data center. This may require installation and testing of a maximum of two different configurations for the data center to ensure that it has been optimally configured.

The embodiments described herein are compatible with any type of data center. For example, some data centers may include on-premises data centers that are privately owned and/or controlled by a customer, and which are typically installed at a customer's location. Some data centers may also include cloud-based data centers comprising centrally located hardware/software hosted by a service provider and available for customer use. Some data centers may include internal storage where disk drives are located internally on a server. Other data centers may include external data storage devices that are communicatively coupled to servers. Object-based storage may also be used by some data centers to manage data as objects. The configuration methods described herein are compatible with any of these types of data centers or storage techniques.

Figure 2:
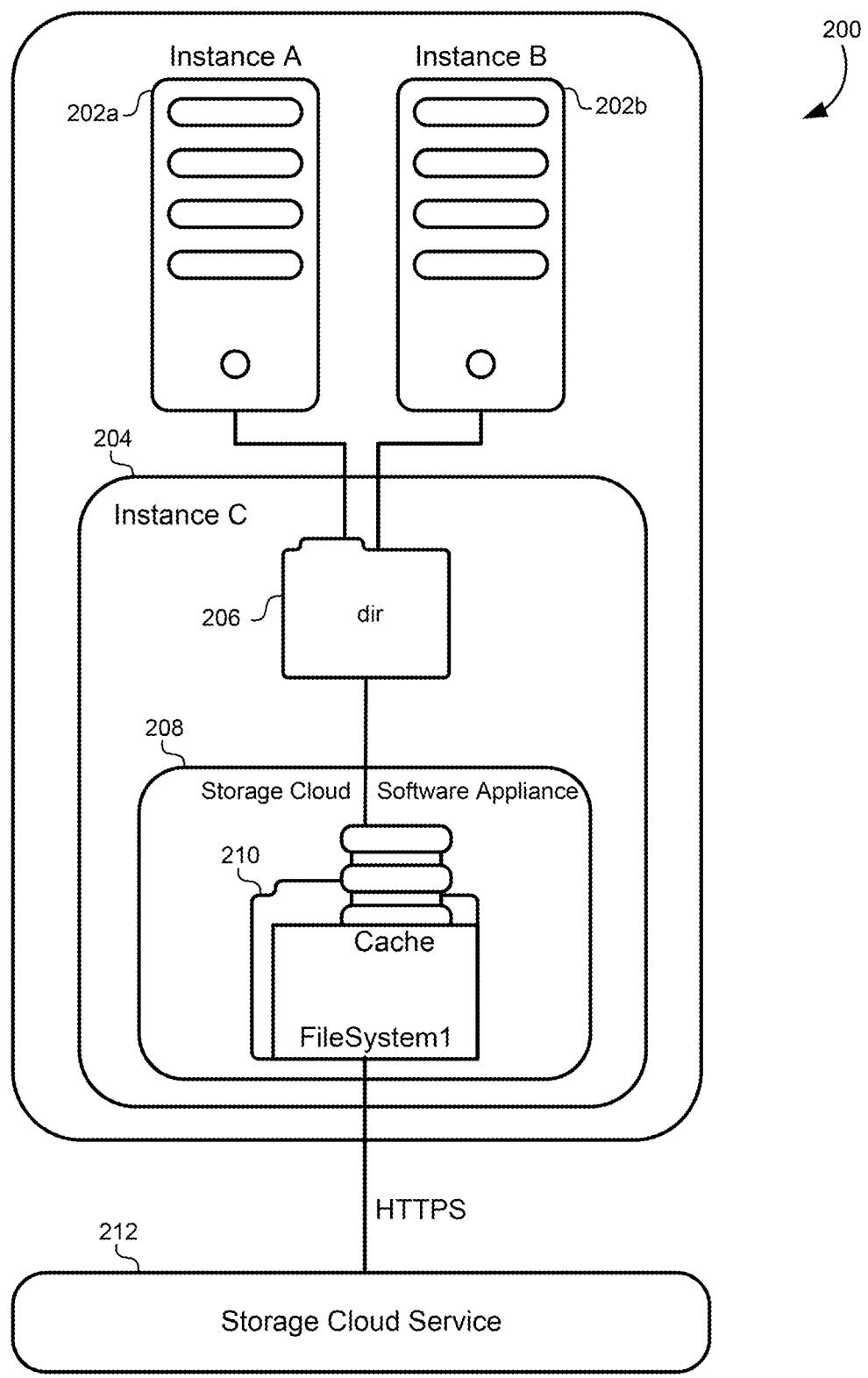
FIG. 2 illustrates a simplified diagram of an object storage system, according to some embodiments.

FIG. 2 illustrates a simplified diagram of an object storage system 200, according to some embodiments. This object storage system 200 is provided as merely one example of a type of data center that may use the autonomous configuration optimization techniques described herein. However, this object storage system 200 is not meant to be limiting, and these techniques may be used with any type of data center. One having ordinary skill in the art will recognize that these techniques are not limited by data center type, but could instead be applied to any data center in its light of this disclosure.

Customers may use a storage cloud service as a storage solution to store their data/files on a public cloud. The object storage system 200 may include an on-premises server 204 that includes customer data stored in a file directory 206. The server 204 may be communicatively coupled to additional server instances 202*a*, 220*b* as part of a data center using the object storage system 200. The server 204 may include a Cloud Storage Software Appliance (CSSA) that is installed at the customer site. The CSSA may act as a cloud storage gateway that connects the on-premises applications and workflows to the public cloud. For example, the CSSA may be implemented using the Oracle Cloud Infrastructure Storage Software Appliance®. The CSSA may communicate with a storage cloud service 212 at a public cloud where the customer's object data may be stored. The CSSA may manage the I/O traffic between the customer's data and/or applications and the public cloud storage devices.

The efficient configuration of the CSSA may be crucial to achieve maximum storage I/O throughput and/or compute performance. Any sub-optimal configuration of the CSSA may result in unsatisfactory functionality of the CSSA characterized by poor throughput or compute performance. This may result in "timeout" failures that are immediately recognizable by the customer. Poor performance due to the configuration of the CSSA may result in a violation of the SLA requirements provided by the cloud service. This may be particularly true for CPU-intensive and I/O-intensive workloads.

The CSSA may include one or more configuration parameters 210. These parameters should be configured to meet the performance specifications of the customer. These performance specifications are often expressed as I/O throughput demands based on a number of concurrent users, a number and/or size of files being stored, a directory hierarchy structure, a number of I/O operations (read, write, append, etc.), and so forth. The performance of the data center in meeting these performance specifications may be governed by the configurable parameters 210 of the CSSA. These are parameters that can be tuned to address customer performance demands. Configuration parameters may include any hardware and/or software parameter that defines the set up and/or operation of the data center. Configuration parameters may include a number of CPUs in the data center; speeds and/or types of CPUs in the data center; a number of HDDs used in the data center; types of hardware used in the data center, including network cards, disk controllers, and databases; cache sizes; and/or any other parameter. Configuration parameters may also include software settings that are used to control hardware operations. As used herein, a configuration or a configuration parameter may include any aspect of a data center as would be understood by one having ordinary skill in the art.

As in any data center, the object storage system 200 may provide many different configurations that may be optimized during installation and operation. The interactions between the customer workload mix and the CSSA may often be very complex, and recommending an optimal configuration solution may be key to achieving satisfactory performance. Any sub-optimal combination of configurations described above would likely results in long latency, low throughput, multiple I/O timeouts, and/or SLA violations. As described above, recommending an optimal configuration for the object storage system 200 or any other data center is becoming increasingly difficult with the growing dependence of performance on altitude and temperature.

To quickly and efficiently provide an optimal configuration for a data center, the embodiments described herein may use a two-stage process. In a first stage, a library of models may be trained for various configurations at many different combinations of temperatures and altitudes. This library of pre-trained models can then be provided to a second stage that is used when a new or existing data center is being installed or reconfigured. The first stage for training the library of models may be performed off-line without regard to a specific data center installation for a customer. Instead, the models may be trained using an environmental chamber that cycles through various combinations of temperatures and altitudes for different data center configurations. This process may be carried out without the pressure of any particular data center installation for a customer, and thus may develop a very comprehensive and robust library of trained models over time. During the second stage, this library may be accessed and used to recommend an optimal configuration for a given data center in real-time without significant delays.

Figure 3:
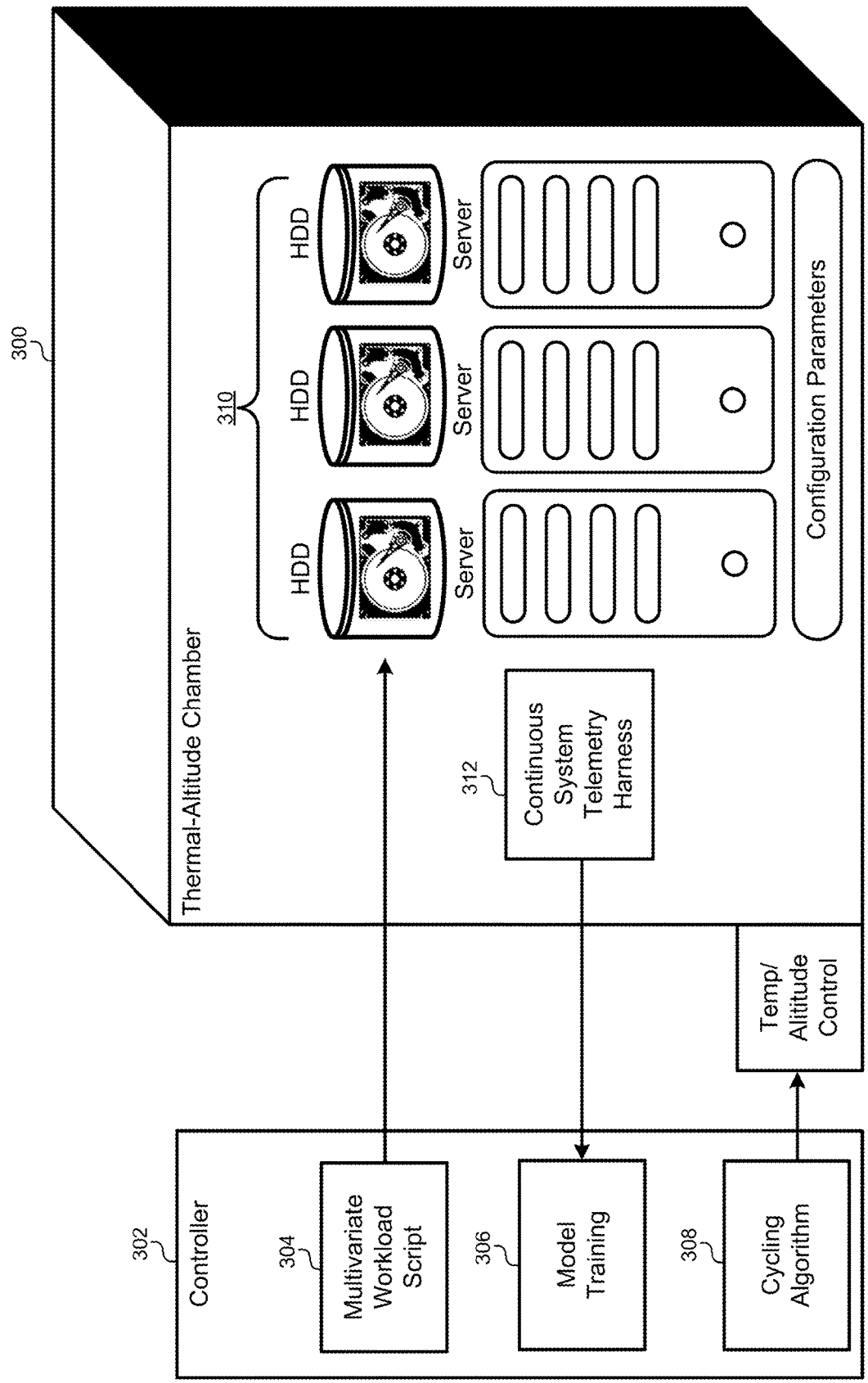
FIG. 3 illustrates a system that may be used to train a library of models at various temperatures and/or altitudes, according to some embodiments.

FIG. 3 illustrates a system that may be used to train a library of models at various temperatures and/or altitudes, according to some embodiments. The system may include an environmental chamber 300 that is configured to adjust and control one or more environmental characteristics of an operating environment for a data center configuration under evaluation. Many different environmental conditions may be monitored and/or controlled by the environmental chamber 300, such as temperature, altitude, humidity, pressure, and so forth. As an example, the embodiments described herein may use a thermal-altitude chamber that is configured to control the ambient temperature inside the chamber 300 and simulate various altitudes in the chamber 300. For the performance reasons discussed above, temperature and altitude are environmental characteristics that may be the most pertinent to data center performance, however they are not meant to be limiting. Other embodiments may use other environmental characteristics when training, monitoring, and using models for a data center.

Various configurations of different data centers may be installed inside the environmental chamber 300. For example, the configuration 300 of the data center in the environmental chamber 300 depicted in FIG. 3 may include a number of servers, HDDs, and/or other hardware that may be used to build the data center. The configuration 300 may also include various configuration parameters that influence or control the operation of the data center. In some embodiments, types of data center configurations may divided into a small number of simplified categories, such as low, medium, and/or high-performance data centers. For example, a first (e.g., low-performance) category of data center may include a limited number of CPUs and/or HDDs. A second (e.g., medium-performance) category of data center may include a larger number of multi-core CPUs and/or GPUs, along with a larger number of HDDs. A third (e.g., high-performance) category of data center may be referred to as an "engineered system" and my use the fastest CPUs/GPUs and provide many petabytes of memory. Within each of these categories of data center, additional configuration parameters may alter the number of hardware components and/or software used in the data center.

When the configuration 300 of the data center is installed in the environmental chamber 300, a controller 302 may provide a multivariate workload script 304 to the configuration 310 of the data center. The data center may then execute the multivariate workload script 304 in the environmental chamber 300. As described below, the workload script 304 may be executed at each different combination of environmental characteristics, such as temperature and altitude. The multivariate workload script 304 may include an extreme stress workload that causes the CPU workload to go from idle to a maximum load, cycling sinusoidal over time to fully evaluate the range of CPU performance. Additionally, the multivariate workload script 304 may be configured to similarly cycle the operation of the HDDs from idle to a maximum load. The multivariate workload script 304 may be designed to cover the range of different workloads that may be experienced by the data center at various customer installations.

The controller 302 may include a cycling algorithm 308 that causes the environmental chamber 300 to cycle through various permutations of different environmental characteristics. In this example, the cycling algorithm may cycle through ranges of temperatures at selected increments of simulated altitudes. In some embodiments, this process may be executed over a multi-hour time interval (e.g., over 24 hours).

At each different combination of temperature and altitude, the multivariate workload script 304 may be executed by the data center in the environmental chamber 300, and telemetry data from the configuration may be collected by the controller 302. In some embodiments, a telemetry harness, such as Oracle's Continuous System Telemetry Harness (CSTH) may be used to collect real-time telemetry data as the data center executes the multivariate workload script 304. The telemetry data may include any electrical and/or environmental characteristic of the data center during operation, including distributed temperatures, ambient temperature, power usage, and so forth. The telemetry data may also produce performance metrics for the data center. For example, the performance metrics may include a performance metric for each CPU in the configuration 310. For each CPU, the telemetry harness 312 may capture data indicating a percent of maximum performance for that CPU. (This may also indicate an inverse of the amount of throttling taking place.) For each HDD, the performance metric may be generated representing an I/O rate recorded as a percent of a maximum I/O rate. The performance metric for the HDDs may also include an indication of a number of Mb/s of I/O throughput. These performance metrics may be used to determine whether the configuration 310 of the data center would meet a customer's SLA requirements at each combination of temperature and altitude.

The telemetry data captured by the telemetry harness 312 may be provided to a model training process 306 that uses the telemetry data to train a model that is specific to the current temperature and altitude combination. The model training process 306 may load a model corresponding to each increment in temperature and/or altitude. The telemetry data received as the data center executes the multivariate workload script 304 at that temperature and altitude combination may be provided to the controller 302, such that each temperature/altitude combination produces a full telemetry suite of signals for training a corresponding model. After a complete cycle through each temperature and altitude increment has been executed, the controller 302 may have a full telemetry time-series signal library over all combinations of temperature and altitude.

Figure 4:
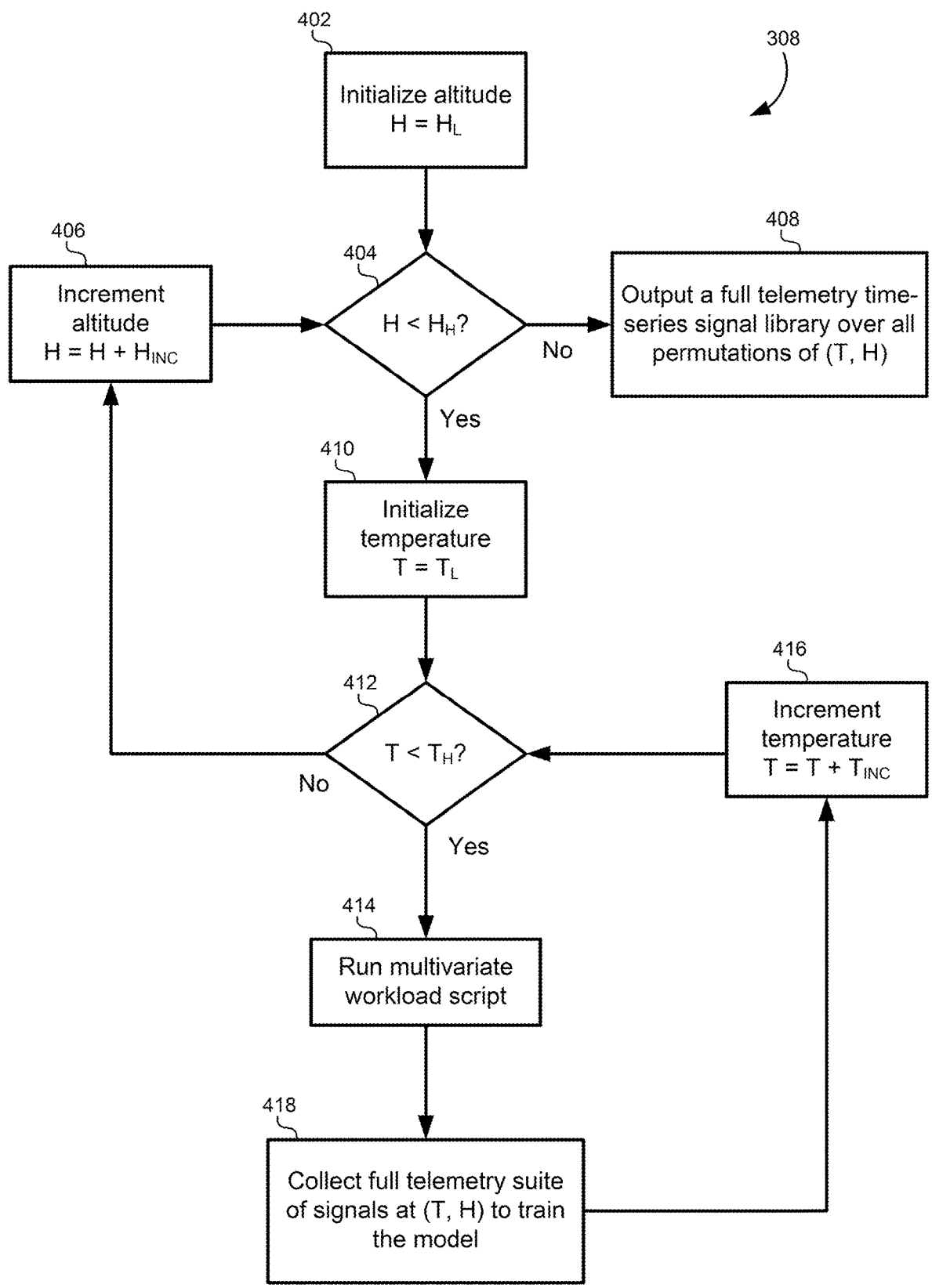
FIG. 4 illustrates a flowchart of the cycling algorithm for controlling the time and/or altitude increments of the environmental chamber, according to some embodiments.

FIG. 4 illustrates a flowchart of the cycling algorithm 308 for controlling the time and/or altitude increments of the environmental chamber, according to some embodiments. The algorithm may begin by initializing the simulated altitude in the environmental chamber to an initial value (402). Throughout this disclosure, mathematical representations of various altitudes—both simulated and measured—may be referred to using the variable H. The initial altitude ($H_L$) may be set at any value. In some embodiments, the initial altitude may be set at sea level (i.e., 0 ft in elevation). The algorithm may then determine whether the current simulated altitude H is less than a maximum simulated altitude (404). The maximum altitude ($H_H$) may also be set to be any value, including 5000 feet, 7000 feet, 10,000 feet, and/or the like.

Next, the algorithm may initialize a temperature in the environmental chamber to an initial value (410). Throughout this disclosure, mathematical representations of temperatures may be referred to using the variable T. The initial temperature ($T_L$) may be set at any value. In some embodiments, the initial temperature may be set at 0° C., 5° C., 15° C., 20° C., and so forth. The algorithm may then determine whether the current temperature T is less than a maximum temperature (412). The maximum temperature ($T_H$) may be set to be any value, such as 15° C., 20° C., 25° C., 30° C., 35° C., 40° C., and so forth.

The algorithm may then cause the data center to run the multivariate workload script at the designated temperature and altitude combination (414). In some embodiments, the algorithm may wait for the altitude and/or temperature in the environmental chamber to stabilize as these values are initially set or incremented. As the multivariate workload script is executed at the designated altitude and temperature, the algorithm may collect a full telemetry suite of signals at that altitude and temperature to be used to train a corresponding model (418) as described in greater detail below.

After the script has been executed and the telemetry signals have been captured at the current temperature/altitude combination, the algorithm may next increment the temperature (416). The temperature may be incremented by any value, such as 0.5° C., 1.0° C., 2.0° C., 2.5° C., 5.0° C., and so forth. The algorithm may then determine whether the incremented temperature is greater than a maximum temperature for which this data center configuration should be tested. If the maximum temperature has not yet been reached, then the algorithm may again run the multivariate workload script (414) and collect a full telemetry suite of signals at the new temperature/altitude combination (418). This cycle may continue collecting telemetry signals across the range of temperatures at the current altitude until the maximum temperature is reached.

After the maximum temperature is reached (412), the algorithm may then increment the altitude simulated by the environmental chamber (406). The altitude may be incremented by any value, such as 100 feet, 200 feet, 250 feet, 500 feet, 1000 feet, and so forth. After the altitude has been incremented, the algorithm may determine whether the new altitude is greater than a maximum altitude for which this data center configuration is to be evaluated (404). If the current altitude is still less than the maximum altitude, then the algorithm may increment through the full range of temperatures at the new altitude as described above. However, when the maximum altitude is reached, the temperature/altitude characterization for the particular data center configuration may be complete. At this point, the system may provide a full telemetry time-series signal library over all combinations of temperature and altitude for training models at each of those combinations.

Figure 5:
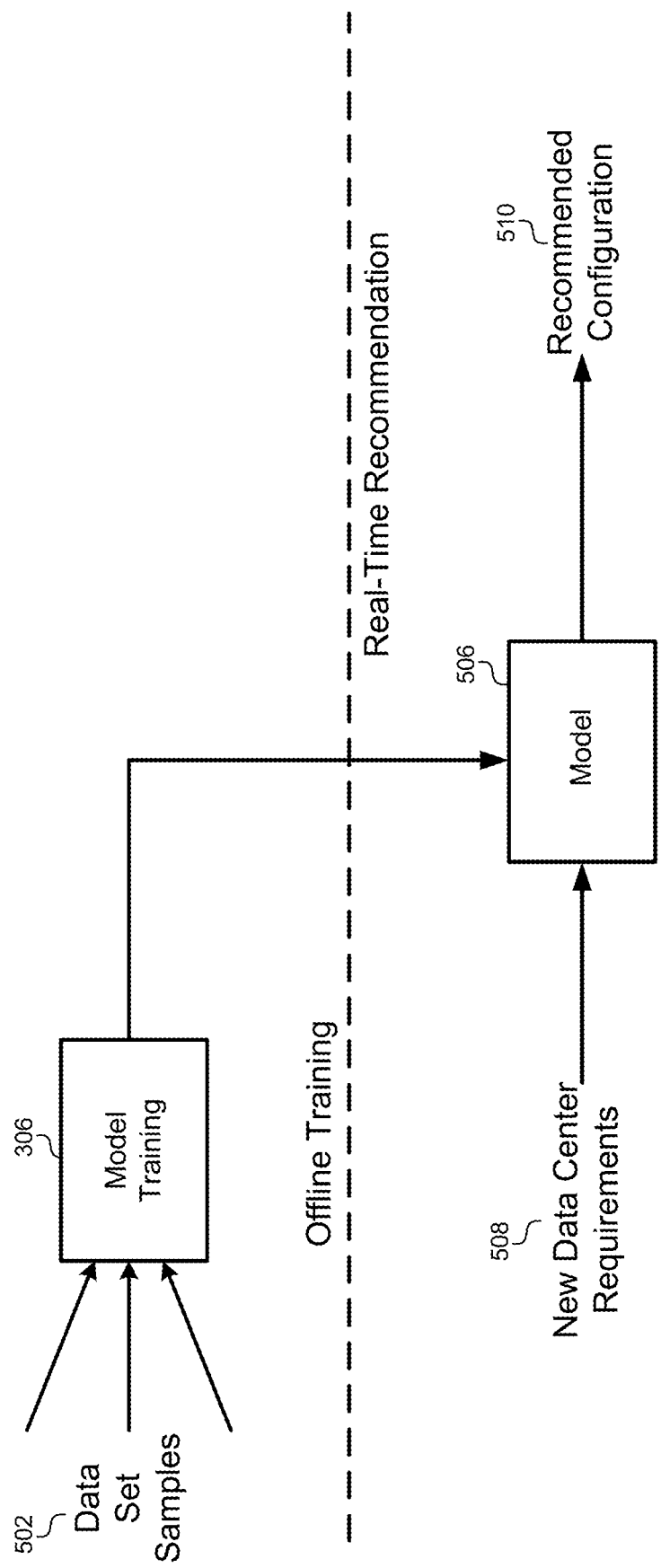
FIG. 5 illustrates a process for training a model at each temperature/altitude combination, according to some embodiments.

FIG. 5 illustrates a process for training a model at each temperature/altitude combination, according to some embodiments. The set of telemetry data 502 collected during the execution of the multivariate script at each time/altitude combination may be provided to a process 306 to train the model. Different embodiments may use different models. For example, some embodiments may use a pattern recognition model, such as the Multivariate State Estimation Technique (MSET) modeling technique, the MSET2 modeling technique, or any other non-linear, non-parametric modeling method. The model may be trained using any of the telemetry data to learn the patterns of correlation between or among all of the configuration parameters affecting the performance of the data center. For example, the MSET2 (which has been used for prognostic and cyber-security use cases in other applications) may learn the interaction of independent variables, such as CPU performance and I/O throughput as a function of the environmental conditions for a particular data center configuration. Additionally, at each temperature/altitude combination, multiple configurations may be tested to train the model. For example, although the process illustrated by FIG. 3 characterizes a single configuration, multiple configurations may be characterized in practice, with each configuration providing telemetry signals through the full range of temperature/altitude combinations illustrated in FIG. 4.

The process for training a library of models may be in ongoing, cumulative calculation that is performed off-line with data accumulated from various data centers. Although the examples described above rely on telemetry data provided from an environmental chamber in a controlled characterization environment, this is not meant to be limiting. Other embodiments may use telemetry data accumulated from other data center environments, including live data center installations used by customers. The result of this off-line training process is a library of pre-trained models that can be used to generate performance metrics, such as Quality of Service (QoS) metrics for different configurations at a given temperature/altitude combination. The library of pre-trained models may also be used to generate a recommended configuration.

The second stage of the autonomous configuration process may include a real-time recommendation. When a new data center is installed for a customer or cloud environment, the pattern recognition algorithm may be transitioned from a training mode into a real-time "recommendation" mode. For example, a particular MSET model 506 may be selected that is closest to the measured temperature/altitude combination of the data center, and the model 506 may be used to output a new configuration that should be used for a given environmental condition based on all of the other correlated variables. For example, the prediction method may be provided a set of data center requirements 508 for the new data center. Telemetry inputs may be provided to the MSET model 506 to generate performance metrics, such as QoS metrics at the given temperature/altitude combination. These QoS metrics may then be compared to the measured QoS metrics of the current configuration of the data center, and a recommendation 510 may be provided for a new configuration if the current configuration is not optimal.

This prognostic machine learning technique may use models that are trained with data center configurations at various temperatures/altitudes. When a customer use case is provided to this method as an inquiry, the method may use the library of pre-trained MSET models to recommend an optimal data center configuration option for the customer based on their workload requirements and the environmental conditions measured at the new data center installation. In some embodiments, a technician installing the data center may use an application or "app" on a smart phone, tablet computer, or other computing device to access the library of pre-trained models. The app may receive the performance data from the data center, including the measured temperature/altitude, and may identify a closest-matching model in the model library. Once the model is identified, the MSET may be used to output a lowest-cost configuration that provides an optimal performance metric to meet the SLA requirements. Some embodiments may also provide a maximum performance that can be achieved given the altitude and ambient temperature of the data center. Conversely, some embodiments may provide a recommended set of environmental conditions given the data center workload and SLA requirements.

Figure 6:
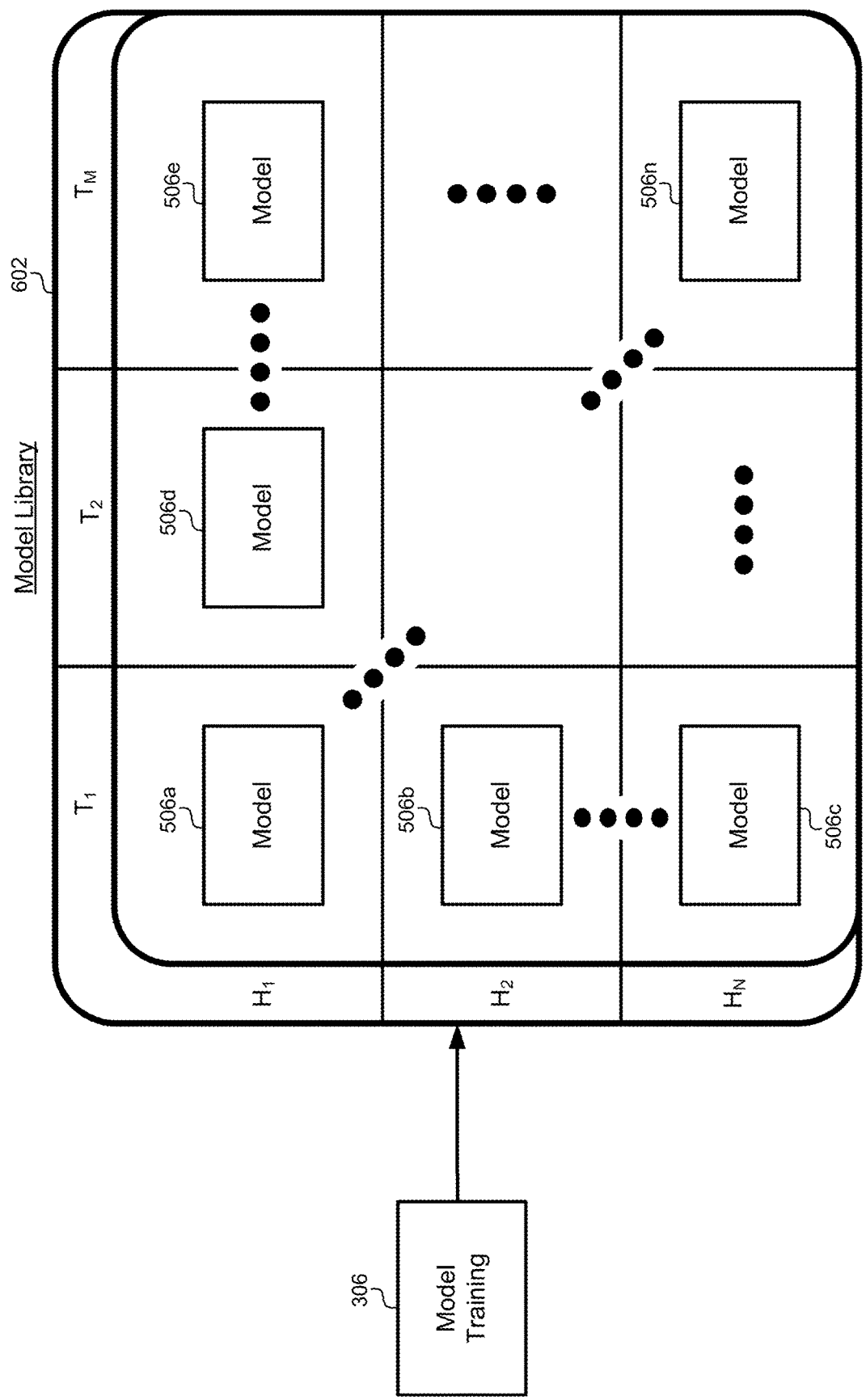
FIG. 6 illustrates a model library that may be generated from the model training process, according to some embodiments.

FIG. 6 illustrates a model library 602 that may be generated from the model training process 306, according to some embodiments. As described above, the model library 602 may include an entry for each combination of temperature and altitude generated by the temperature/altitude cycling algorithm in FIG. 4. Models 506 may be trained at each temperature/altitude combination using a plurality of different data center configurations in the environmental chamber illustrated in FIG. 3. The number of models 506 that populate the model library 602 may depend on the range of temperatures/altitudes that are generated by the cycling algorithm in FIG. 4. The number of models 506 may also depend on the temperature/altitude increments that are used between each execution of the workload script by the data center. The smaller the temperature/altitude increments, the more fine-grained the model library 602 may be. This increases the likelihood that a new data center installation may be closely matched with a pre-trained model in the model library 602.

It should be emphasized that this second stage of the process for configuring a new data center installation may be performed in a matter of hours or even minutes. Because the model library has been previously populated with pre-trained models, the model inputs from the new data center installation can be quickly provided to an existing model to generate corresponding performance metrics that may be compared to the performance metrics of the current configuration of the new data center. If the closest model generates better QoS results than the current configuration, then the configuration provided by the model may be used in place of the current configuration of the new data center installation. This may be compared to previous processes used to configure a data center. Generally, there was no systematic, parameterized method for determining whether a current configuration was optimal. Instead, various parameters of the configuration for the data center would be adjusted until the SLA requirements could be met. This was often a trial-and-error process that took many iterations and could take days or weeks. This autonomous data center configuration process described herein reduces this time dramatically by limiting the number of different configurations that need to be tested against the SLA requirements to a maximum of two.

Figure 7:
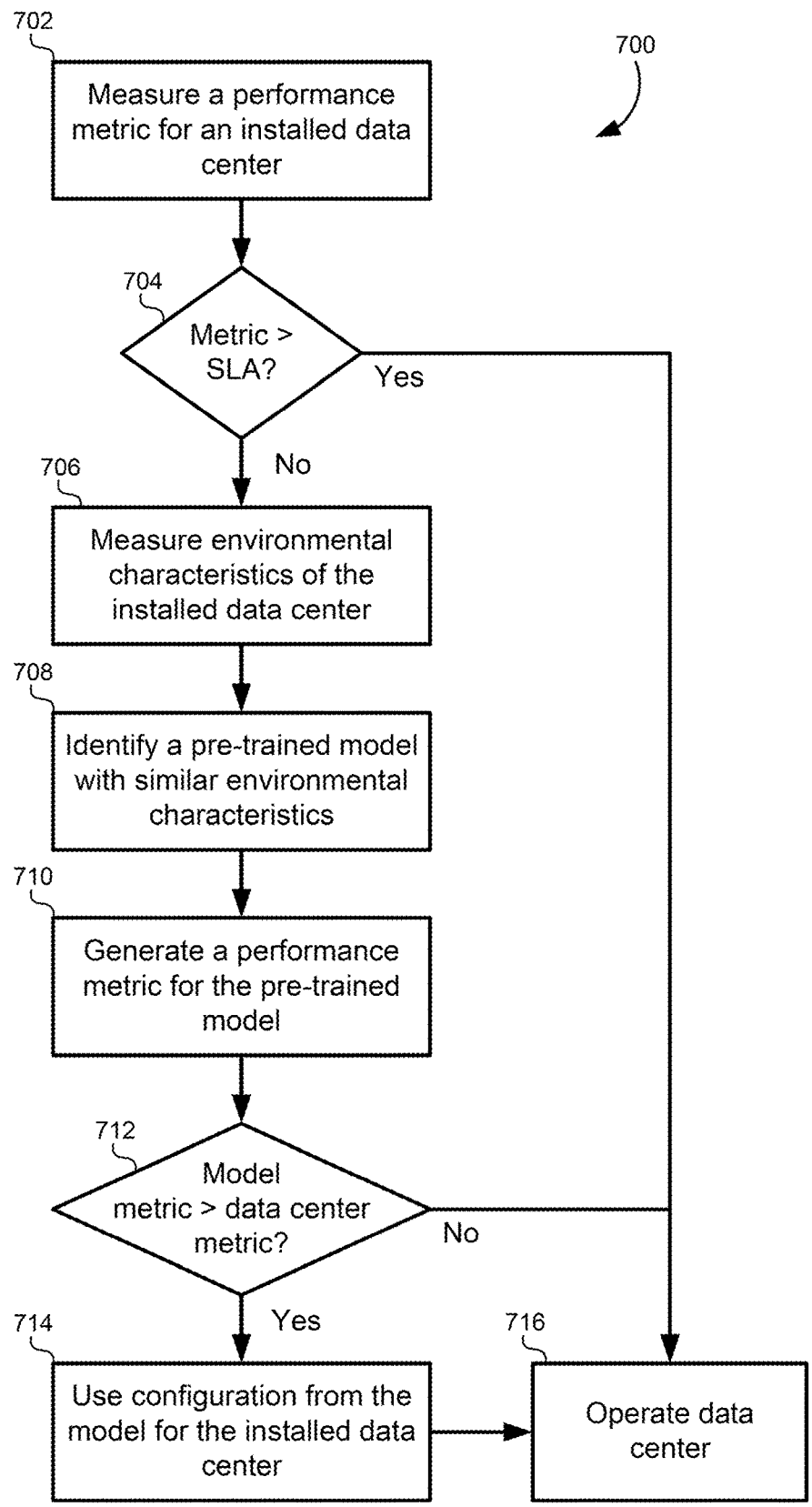
FIG. 7 illustrates a flowchart of a method for autonomously determining an optimal configuration for a data center using a library of models pre-trained at various combinations of environmental characteristics, according to some embodiments.

FIG. 7 illustrates a flowchart 700 of a method for autonomously determining an optimal configuration for a data center using a library of models pre-trained at various combinations of environmental characteristics, according to some embodiments. The method may include receiving or measuring a first performance metric from a data center (702). The data center may include a new data center installation or a previously installed data center where the configuration is being updated. For example, an existing data center may begin to fail its SLA requirements at higher workloads or varying temperatures, and this method may be executed to reconfigure the data center in a more optimal fashion. The data center may have an existing configuration referred to herein as a "first configuration" to distinguish this configuration from other configurations. A subsequent configuration may be referred to as a "second configuration" merely to distinguish it from the first configuration. The terms first/second are not meant to indicate order, precedence, importance, or any other comparative quality between configurations. Similarly, the "first performance metric" may be referred to as such to distinguish the performance metric generated by the data center from a "second" performance metric generated by one of the pre-trained models. The first performance metric may include any QoS metric, such as CPU performance as a percentage of maximum performance, I/O throughput, I/O rate, latency, and so forth. The first performance metric may be measured and/or generated in real time as the data center executes a workload, such as the multivariate workload script described above.

Optionally, the method may include determining whether the first performance metric meets an SLA requirement (704). For example, a number of timeout errors may be compared to an SLA requirement. A measured bandwidth or latency may be compared to an SLA requirement. A CPU performance or power consumption may be compared to an SLA requirement. If some cases, if the first performance metric meets or exceeds the SLA requirement then the method may simply determine that the current configuration of the data center is sufficient, and the data center may be operated using the current configuration (716). Note that there will generally be multiple SLA requirements and multiple performance metrics to be compared to those SLA requirements. This method only recites a single performance metric and SLA requirement as an example, but it should be understood that other embodiments may require each performance metric to meet a corresponding SLA requirement before allowing the data center to continue operating in the current configuration without any adjustments.

The method may additionally include receiving or measuring one or more environmental characteristics for the data center as the data center executes the workload (706). A similar telemetry system as described above in relation to FIG. 3 may be used for the data center to collect telemetry data during execution of the multivariate workload script. The telemetry data may include environmental conditions such as temperature and/or altitude.

The method may further include identifying a pre-trained model in the model library with similar environmental characteristics (708). The model may be previously trained using data from one or more data center configurations operating in a controlled environment, such as the environmental chamber described above in relation to FIG. 3. The method may receive the environmental characteristics and autonomously select a corresponding model from the model library that was trained at a similar temperature/altitude combination. In some cases, the current environmental conditions of the data center may match environmental conditions for a pre-trained model. For example, for a data center at sea level and operating at 25° C., the model library may include a corresponding model trained at those corresponding environmental conditions. However, it may often be the case that the current operating conditions of the data center may fall somewhere between the available temperature/altitude combinations in the model library. When an exact match is not available, the method may choose a model having environmental characteristics that are most similar to the environmental characteristics of the data center. For example, some embodiments may use a nearest-neighbor algorithm to select a pre-trained model as described in detail below in relation to FIG. 8.

The method may also include generating a performance metric for the pre-trained model (710). This performance metric may be referred to herein as a "second performance metric" to distinguish it from the first performance metric described above. This performance metric may be of the same type as the first performance metric such that they may be compared. This performance metric may include any QoS metric described herein. Again, this method may include generating a plurality of performance metrics, each of which may be compared with the performance metrics from the data center configuration, and each of which may be required to pass the SLA requirements. This step of the method may be repeated for each performance metric under consideration.

The method may further include comparing the performance metric from the data center configuration with the performance metric generated by the pre-trained model (712). If the performance metric from the data center is better than the performance metric from the model, then the configuration of the data center may be considered optimal, and the data center may continue to operate with the existing configuration (716). However, if the performance metric from the pre-trained model is better than the performance metric from the data center configuration, then the method may include determining a new configuration for the data center from the model and using the configuration from the model for the installed data center (714). Because the model was trained using a variety of different configuration parameters, the model may output the data center configuration for that altitude/temperature combination that will generate the best QoS results.

If a more optimal data center configuration is generated by the model, then the new data center configuration can be implemented in the data center (716). The new configuration can then be tested to ensure that the new configuration meets the SLA requirements, and the configuration process may be completed. Note that only two different configurations may need to be tested to determine an optimal configuration. If the first configuration is better than the configuration generated by the corresponding pre-trained model, then the first configuration may be considered optimal. However, if the second configuration generated by the pre-trained model generates a better QoS metric, then the second configuration may be considered optimal without any further configuration testing.

It should be appreciated that the specific steps illustrated in FIG. 7 provide particular methods of optimizing a configuration of a data center according to various embodiments. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
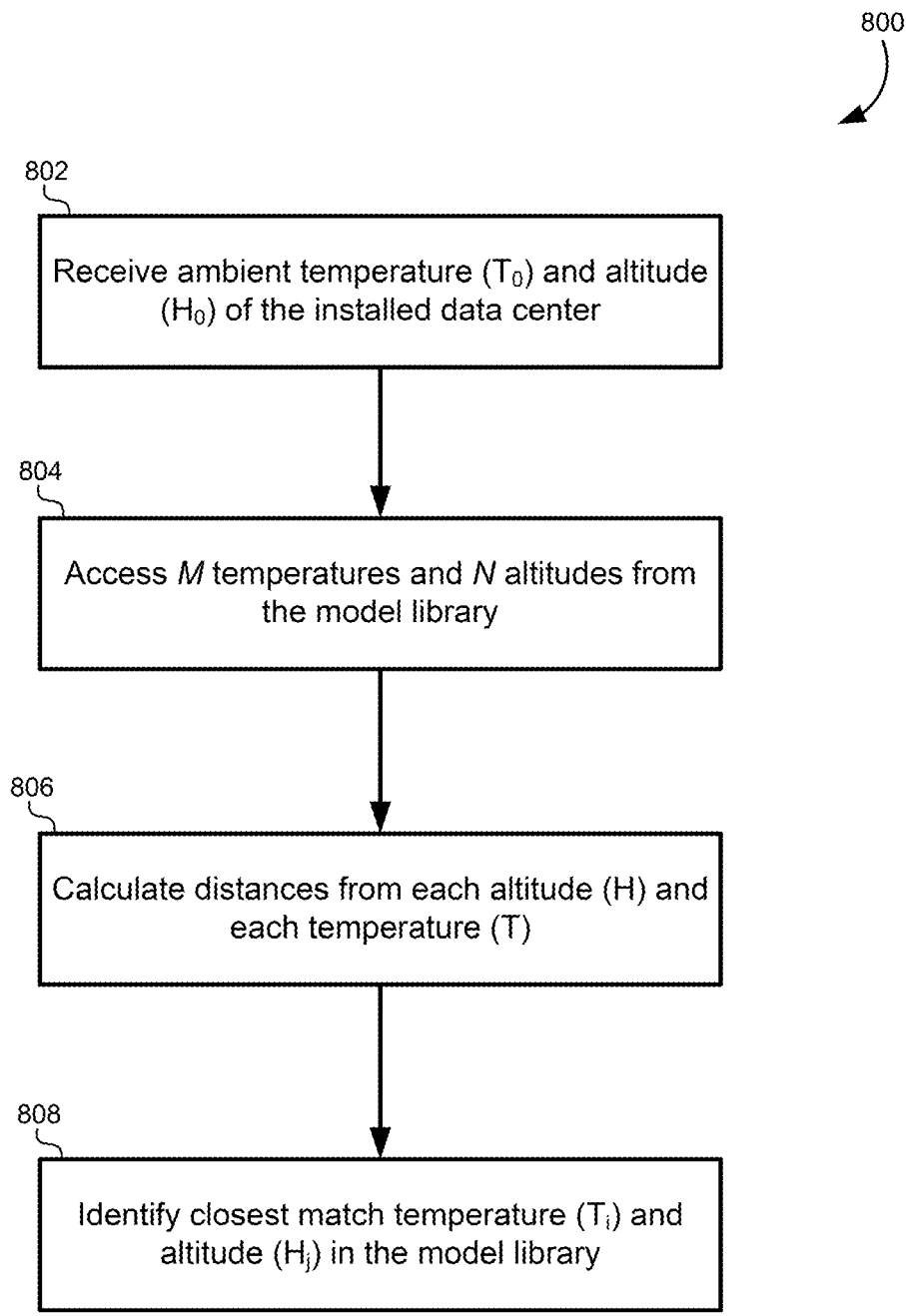
FIG. 8 illustrates a flowchart of a method for selecting a pre-trained model having environmental characteristics that are similar to the environmental characteristics of the data center, according to some embodiments.

FIG. 8 illustrates a flowchart 800 of a method for selecting a pre-trained model having environmental characteristics that are similar to the environmental characteristics of the data center, according to some embodiments. As described above, an exact match between the environmental characteristics of the data center and the environmental characteristics for a pre-trained model may not always be available. Depending on the temperature/altitude increments used when generating the model library, some data centers may operate at temperatures/altitudes that fall between the temperatures/altitudes corresponding to pre-trained models. Therefore, some embodiments may select a model by identifying a model with the most similar environment of characteristics. This may include using a nearest-neighbor algorithm to identify the closest temperature/altitude match in the model library. The method in flowchart 800 illustrates one example method of identifying a nearest neighbor model.

The method may include receiving an ambient temperature and an altitude of the installed data center (802). The temperature/altitude may be received as part of the telemetry data used when testing the first data center configured as described above. The method may also include accessing the temperatures and altitudes used generate the model library (804). For example, a sequence of M temperature values may be combined with a sequence of N altitude values to index entries in the model library. The method may then include calculating a distance, such as a Euclidean distance, between each combination of M temperature values and N altitude values in the library and the ambient temperature and altitude of the data center (806). In some embodiments, the method may first calculate and minimize a distance between altitudes, then minimize a distance between ambient temperatures. The method may then identify the temperature/altitude pair in the library having the minimum distance from the temperature/altitude of the data center (808). The minimization of this distance may be calculated using the following equation:

$$\min \sum_M \sum_N \sqrt{(T_i - T_0)^2 + (H_j - H_0)^2}$$

In this equation, $T_0$ and $H_0$ represent the ambient temperature and altitude of the data center, while $T_i$ and $H_j$ represent range of temperature and altitude values in the model library. Once the values for $T_i$ and $H_j$ have been identified that minimize this equation, these values may be used to index the model library and retrieve a corresponding nearest-neighbor model to be used.

The embodiments disclosed herein may use various computing environments, including a networked computing environment, a cloud service environment, and a computer architecture comprising processors, memories, instruction sets, and so forth. The following figures describe hardware/software systems that may be used to implement various embodiments described herein. These hardware/software systems may also be used to interact with the embodiments described herein.

Additionally, each step of these methods may be executed automatically by a computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
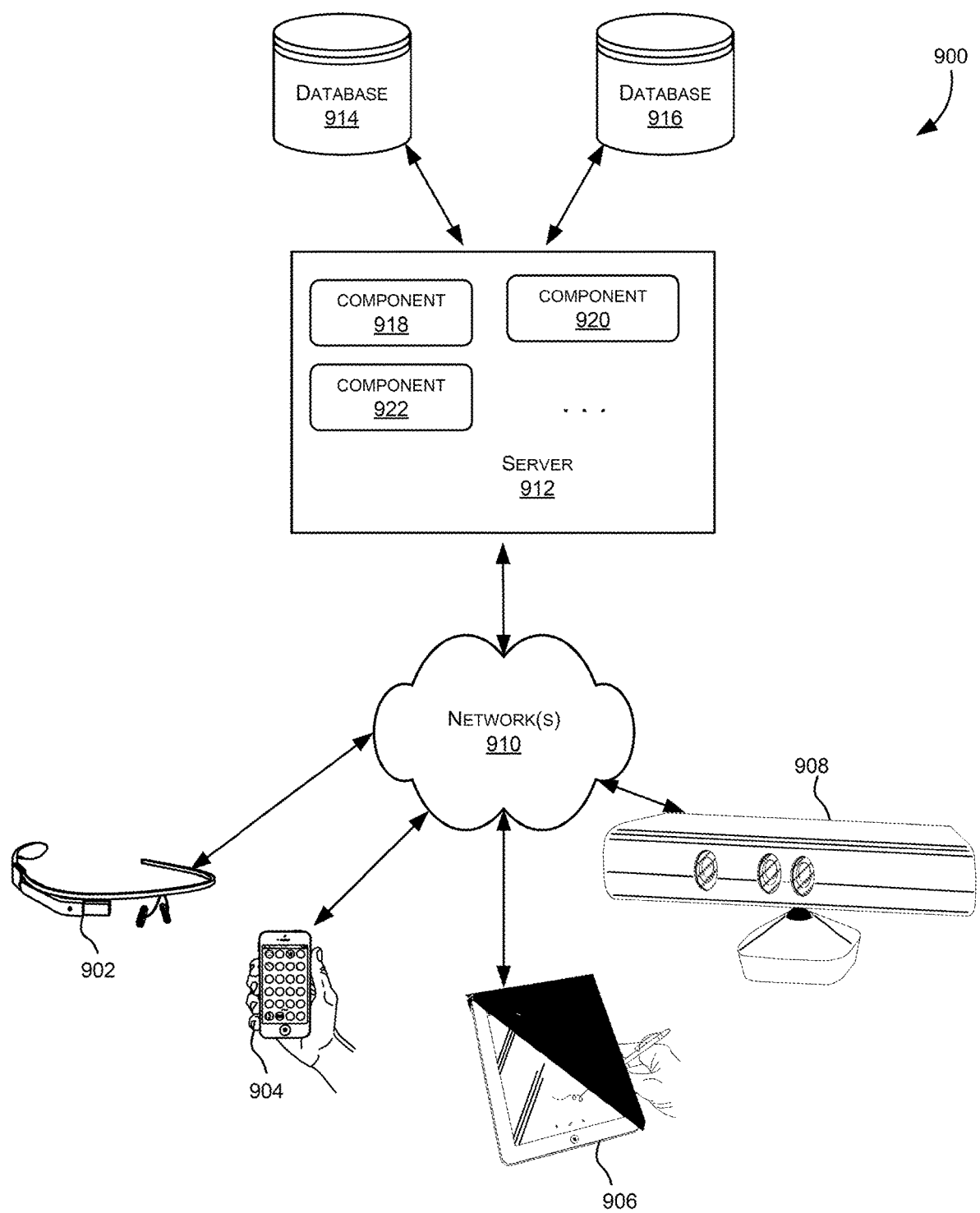
FIG. 9 illustrates a simplified block diagram of a distributed system for implementing some of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
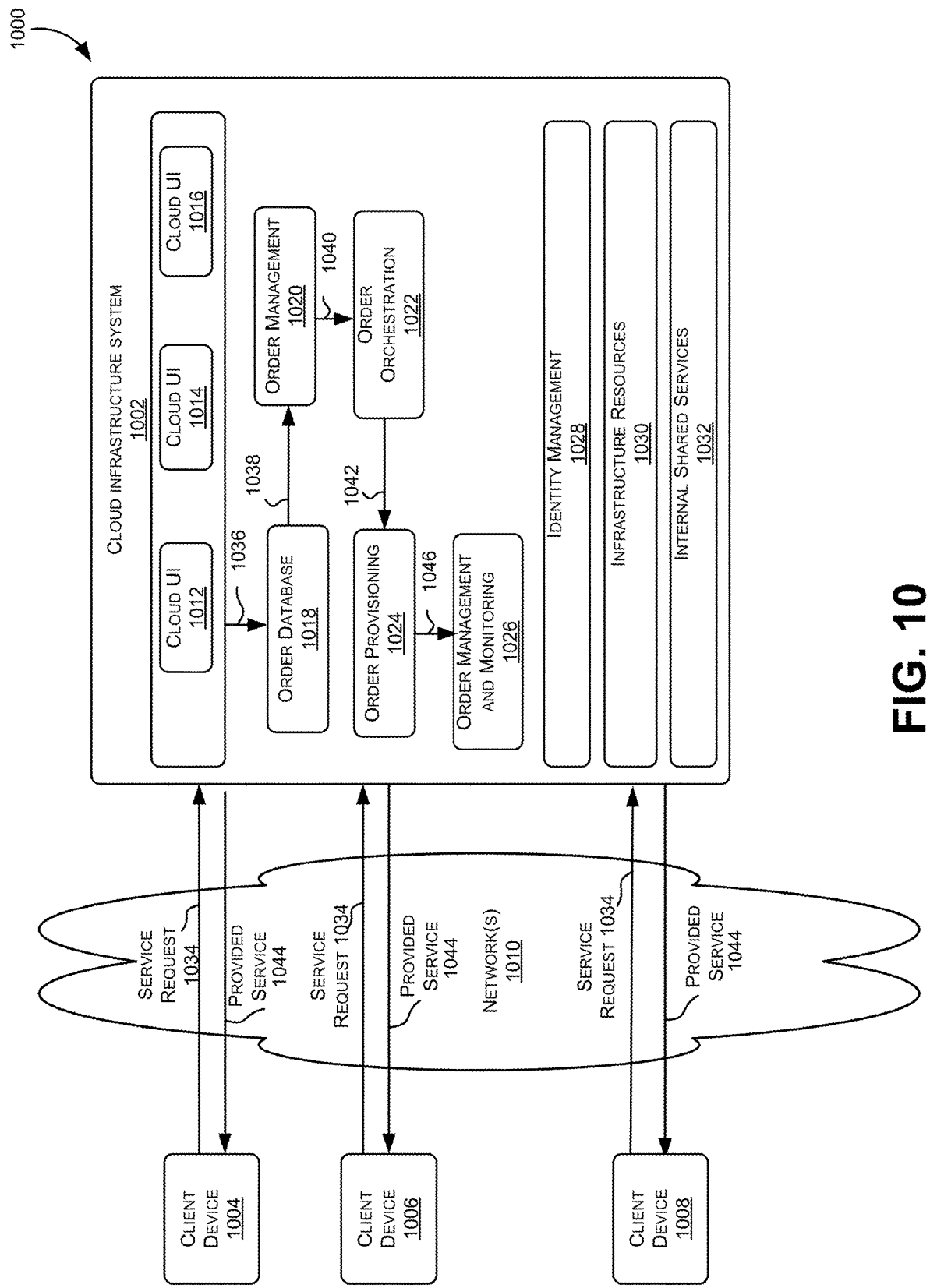
FIG. 10 illustrates a simplified block diagram of components of a system environment by which services provided by the components of an embodiment system may be offered as cloud services.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
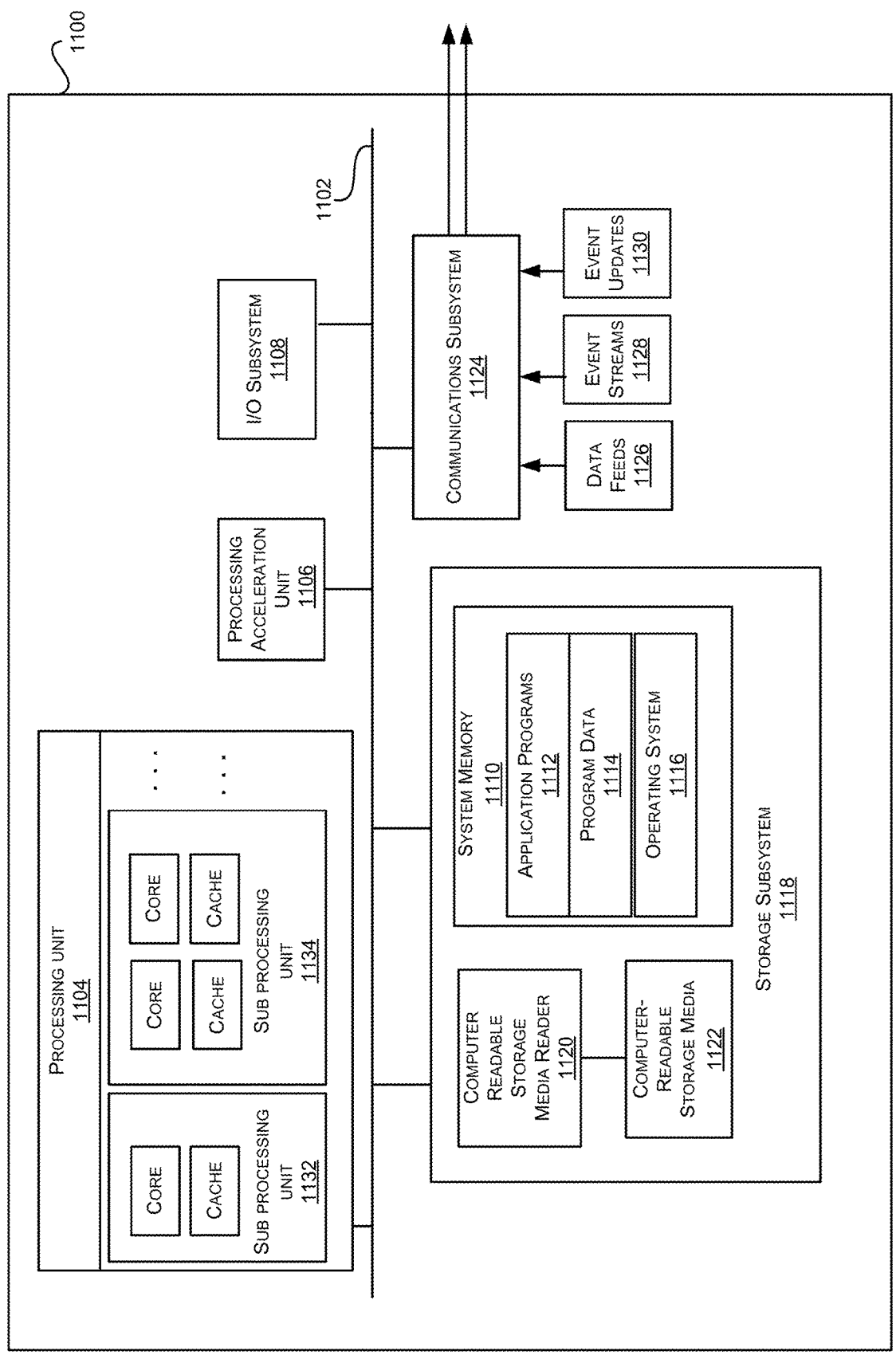
FIG. 11 illustrates an exemplary computer system, in which various embodiments may be implemented.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
    identifying a data center configuration in an environmental chamber, wherein the environmental chamber is configured to adjustably control environmental characteristics around the data center configuration while in operation;
    executing a workload by the data center configuration while in the environmental chamber;
    while executing the workload, adjusting a temperature and a simulated altitude around the data center configuration;
    recording performance data from the data center configuration while executing the workload; and
    training a model using the performance data from the data center configuration, wherein the model is trained to receive requirements for a data center as an input and generate a recommended data center configuration as an output at the simulated altitude and temperature.

2. The non-transitory computer-readable medium according to claim 1, wherein the performance data is recorded at each of a plurality of increments of the temperature and the simulated altitude around the data center configuration.

3. The non-transitory computer-readable medium according to claim 2, wherein the plurality of increments of the temperature includes temperatures between approximately 15° C. and 35° C.

4. The non-transitory computer-readable medium according to claim 2, wherein the plurality of increments of the temperature are incremented at intervals of approximately 1° C.

5. The non-transitory computer-readable medium according to claim 2, wherein the plurality of increments of the simulated altitude includes altitudes between approximately sea level and 5000 feet.

6. The non-transitory computer-readable medium according to claim 2, wherein the plurality of increments of the simulated altitude are incremented at intervals of approximately 100 ft.

7. The non-transitory computer-readable medium according to claim 1, wherein the operations further comprise:
    placing a plurality of data center configurations in the environmental chamber;
    executing the workload by each of the plurality of data center configuration while in the environmental chamber;
    while executing the workload, adjusting the temperature and the simulated altitude around each of the plurality of data center configurations;
    recording performance data from each of the plurality of data center configurations while executing the workload; and
    training models corresponding to each of the plurality of data center configurations using the performance data from each of the plurality of data center configurations while executing the workload.

8. The non-transitory computer-readable medium according to claim 7, wherein the operations further comprise:
    receiving a first performance metric from a data center, wherein:
        the data center comprises a first configuration; and
        the first performance metric is generated as the data center executes the workload;
    receiving one or more environmental characteristics for the data center as the data center executes the workload;
    identifying a first model from the plurality of models that was trained using data from one of the plurality of data center configurations that was operating in a simulated environment having environmental characteristics that are similar to the one or more environmental characteristics of the data center;
    generating a second performance metric from the first model;
    comparing the second performance metric to the first performance metric; and
    determining a second configuration for the data center from the first model.

9. The non-transitory computer-readable medium according to claim 8, wherein the one or more environmental characteristics comprise an ambient temperature surrounding the data center and an altitude at which the data center is installed.

10. The non-transitory computer-readable medium according to claim 8, wherein identifying the first model comprises:
    executing a nearest-neighbor algorithm to identify the environmental characteristics that are most similar to the one or more environmental characteristics.

11. The non-transitory computer-readable medium according to claim 8, wherein the nearest-neighbor algorithm minimizes a difference between a temperature for the first model and a temperature for the data center, and minimizes a difference between a simulated altitude of the first model and an altitude of the data center.

12. The non-transitory computer-readable medium according to claim 8, wherein the first configuration comprises a number and type of processors in the data center.

13. The non-transitory computer-readable medium according to claim 8, wherein the first configuration comprises a number and type of hard disk drives in the data center.

14. The non-transitory computer-readable medium according to claim 8, wherein the first configuration comprises a data cache size.

15. The non-transitory computer-readable medium according to claim 8, wherein the data center comprises a cloud data center.

16. The non-transitory computer-readable medium according to claim 8, wherein the operations further comprise:
    comparing the first performance metric to a Service Level Agreement (SLA); and
    determining that the first performance metric does not meet the SLA, wherein the first model is identified in response to determining that the first performance metric does not meet the SLA.

17. The non-transitory computer-readable medium according to claim 8, wherein the operations further comprise:
    determining that the second performance metric exceeds the first performance metric; and
    providing the second configuration to be implanted by the data center.

18. The non-transitory computer-readable medium according to claim 8, wherein the first performance metric comprises a processor performance for each processor in the data center, and an I/O performance for each hard disk drive in the data center.

19. A system comprising:
    one or more processors; and
    one or more memory devices comprising instructions that, when executed by the one or more processors, cause the one or more processors to perform operations comprising:
        identifying a data center configuration in an environmental chamber, wherein the environmental chamber is configured to adjustably control environmental characteristics around the data center configuration while in operation;
        executing a workload by the data center configuration while in the environmental chamber;
        while executing the workload, adjusting a temperature and a simulated altitude around the data center configuration;
        recording performance data from the data center configuration while executing the workload; and
        training a model using the performance data from the data center configuration, wherein the model is trained to receive requirements for a data center as an input and generate a recommended data center configuration as an output at the simulated altitude and temperature.

20. A method for autonomously determining an optimal configuration for data centers using a library of models pre-trained at various combinations of environmental characteristics, the method comprising:
    identifying a data center configuration in an environmental chamber, wherein the environmental chamber is configured to adjustably control environmental characteristics around the data center configuration while in operation;
    executing a workload by the data center configuration while in the environmental chamber;
    while executing the workload, adjusting a temperature and a simulated altitude around the data center configuration;
    recording performance data from the data center configuration while executing the workload; and
    training a model using the performance data from the data center configuration, wherein the model is trained to receive requirements for a data center as an input and generate a recommended data center configuration as an output at the simulated altitude and temperature.

* * * * *